UNITED STATES PATENT OFFICE.

MAX WYLER, OF MANCHESTER, ENGLAND, ASSIGNOR TO LEVINSTEIN LIMITED, OF MANCHESTER, LANCASTER, ENGLAND.

SULFUR DYESTUFF.

1,358,490.  Specification of Letters Patent.  Patented Nov. 9, 1920.

No Drawing.  Application filed March 27, 1919.  Serial No. 285,491.

*To all whom it may concern:*

Be it known that I, MAX WYLER, a citizen of the Confederation of Switzerland, and a resident of Manchester, in the county of Lancaster, England, have invented a certain new Sulfur Dyestuff, of which the following is a specification.

It has been shown (see *Berichte*, vol. 36, page 962 and vol. 36, page 1583) that by the action of sulfur on acenaphthene two products are obtained: dinaphthylenethiophene and trinaphthylenebenzene. We have found that by heating sulfur and acenaphthene in different proportions a new product is formed, which is soluble in sodium sulfid and which is capable of dyeing cotton from its sulfid solution in reddish brown shades of extraordinary fastness to washing and orin.

The following example will serve as an illustration how to obtain the new and valuable dye:—

1 part of acenaphthene is mixed with 3½ parts of sulfur and the mixture is heated at from 250–300° C. till the melt becomes thick and soluble in sodium sulfid, which requires about 24 hours. The melt is powdered, dissolved in a boiling 10% solution of sodium sulfid and filtered if necessary, and the dyestuff is precipitated from its solution by hydrochloric acid. It is then collected on a filter, washed and dried.

We do not confine ourselves to the particulars described in our example, which may be varied without altering the character of the invention.

What I claim as my invention and desire to secure by Letters Patent is:—

1. The process for the production of a new sulfur dyestuff, which process consists in heating one part of acenaphthene with 3½ parts of sulfur at from 250° C. to 300° C. until the melt becomes thick and soluble in sodium sulfid, then powdering the melt, dissolving same in a boiling 10% solution of sodium sulfid, filtering the solution if necessary, and precipitating the dyestuff therefrom.

2. The process for the production of a new sulfur dyestuff, which process comprises heating acenaphthene and sulfur in proportions of approximately 1 to 3½ respectively.

3. The process for the production of a new sulfur dyestuff which process comprises heating acenaphthene and sulfur in proportions of approximately 1 to 3½ respectively at a temperature between 250° and 300° until the melt becomes thick and soluble in sodium sulfid.

4. The process for the production of a new sulfur dyestuff, which process comprises heating acenaphthene and sulfur in proportions of approximately 1 to ½ respectively, powdering the product and dissolving the same in a boiling 10% solution of sodium sulfid.

5. The process for the production of a new sulfur dyestuff, which process comprises heating acenaphthene and 'fur in proportions of approximately 1 to 3½ respectively, powdering the product, dissolving the same in a boiling 10% solution of sodium sulfid, and then precipitating the dyestuff from the solution with hydrochloric acid.

In witness whereof I have hereunto set my hand.

MAX WYLER.